(12) United States Patent
Araki et al.

(10) Patent No.: US 6,599,195 B1
(45) Date of Patent: *Jul. 29, 2003

(54) BACKGROUND SOUND SWITCHING APPARATUS, BACKGROUND-SOUND SWITCHING METHOD, READABLE RECORDING MEDIUM WITH RECORDING BACKGROUND-SOUND SWITCHING PROGRAM, AND VIDEO GAME APPARATUS

(75) Inventors: Shigeru Araki, Takatsuki (JP); Hideto Inoue, Ashiya (JP); Kazuhiko Uehara, Kobe (JP)

(73) Assignees: Konami Co., Ltd., Hyogo-ken (JP); Kabushiki Kaisha Konami Computer Entertainment Osaka, Osaka-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,477

(22) Filed: Oct. 5, 1999

(30) Foreign Application Priority Data

Oct. 8, 1998 (JP) .......................................... 10-303392

(51) Int. Cl.⁷ ................................................ A63F 9/00
(52) U.S. Cl. .............................. 463/43; 463/35; 463/30; 463/31
(58) Field of Search ............................. 463/30, 31, 35, 463/43; 345/419, 427, 32; 381/17–18, 61, 63, 123, 306, 310; 273/435; 700/94

(56) References Cited

U.S. PATENT DOCUMENTS

| | | | |
|---|---|---|---|
| 3,795,769 A | * 3/1974 | Nowka et al. ................. 381/77 |
| 4,375,287 A | * 3/1983 | Smith ............................. 463/35 |
| 5,026,051 A | 6/1991 | Lowe et al. |
| 5,052,685 A | 10/1991 | Lowe et al. |
| 5,138,660 A | 8/1992 | Lowe et al. |
| 5,390,938 A | * 2/1995 | Takeya ........................... 463/35 |
| 5,393,073 A | * 2/1995 | Best ............................... 463/35 |
| 5,581,618 A | * 12/1996 | Satoshi et al. ................. 381/17 |
| 5,604,810 A | 2/1997 | Yanagawa |
| 5,633,985 A | 5/1997 | Severson et al. |
| 5,633,993 A | * 5/1997 | Redmann et al. ........... 395/119 |
| 5,754,660 A | 5/1998 | Shimizu |
| 5,768,393 A | 6/1998 | Mukojima et al. |
| 5,862,229 A | 1/1999 | Shimizu |

(List continued on next page.)

FOREIGN PATENT DOCUMENTS

| | | | |
|---|---|---|---|
| EP | 0 725354 A | * | 1/1995 |
| JP | 07-178224 | | 7/1995 |
| JP | 08-149600 | | 6/1996 |
| JP | 10-211358 | | 8/1998 |
| WO | WO 94/17515 | * | 1/1994 |

*Primary Examiner*—Jessica Harrison
*Assistant Examiner*—Yveste G Cherubin
(74) *Attorney, Agent, or Firm*—Jordan and Hamburg LLP (57) ABSTRACT

A background-sound switching method and apparatus is provided for switching of background-music data. A partitioning code represents an end position of a phrase of background sounds outputted through a speaker. A switching instruction device outputs a switching-instruction signal which causes switching from the background-sound data being outputted to a D/A converter to other background-sound data. Following output of the switching-instruction signal, a data-number controller stores in RAM a data number which defines a next background-sound data to be outputted to the D/A converter. A code detector detects the partitioning code of the background-sound data being outputted. At each time the partitioning code is detected, a switching controller determines whether or not the data number is stored in the RAM and, if the data number is stored in the RAM, the background-sound data being outputted is switched to the other background-sound data defined by the data number.

19 Claims, 9 Drawing Sheets

U.S. PATENT DOCUMENTS

| | | | |
|---|---|---|---|
| 5,883,804 A | * 3/1999 | Christensen | 700/94 |
| 5,977,471 A | 11/1999 | Rosenzweig | |
| 5,993,318 A | * 11/1999 | Kousaki et al. | 463/35 |
| 6,111,959 A | 8/2000 | Taylor | |
| 6,253,293 B1 | * 6/2001 | Rao et al. | 711/147 |
| 6,330,486 B1 | 12/2001 | Padula | |
| 6,347,998 B1 | * 2/2002 | Yoshitomi et al. | 463/42 |
| 6,466,833 B1 | * 10/2002 | Lau | 700/94 |

* cited by examiner

BACKGROUND SOUND SWITCHING APPARATUS, BACKGROUND-SOUND SWITCHING METHOD, READABLE RECORDING MEDIUM WITH RECORDING BACKGROUND-SOUND SWITCHING PROGRAM, AND VIDEO GAME APPARATUS

BACKGROUND OF THE INVENTION

1. Field of the Invention

The present invention relates to a background-sound switching apparatus, a background-sound switching method, and a readable recording medium containing a background-sound switching program which switch background sounds created corresponding to variations of events to be displayed in display means.

2. Description of the Related Art

Hitherto, a system for displaying variations of events, for example, in a video game, has been known. In this system, generally, background sounds created corresponding to images to be displayed on display means are outputted through a speaker so as to improve the effectiveness of the images displayed on the display means. For example, in a video game, background sounds produced corresponding to game images are outputted through a speaker so as to improve the simulation realism of the game. Generally, these background sound pieces are composed using multiple pieces of background-sound data created for, for example, individual game stages; and the background-sound data to be outputted through the speaker is switched as the displayed game stage changes.

However, the background-sound data to be outputted through the speaker is not suitably switched. This causes unnatural changes when the switching boundary is perceived by the ear, preventing the effectiveness of displayed images from being improved.

SUMMARY OF THE INVENTION

In view of the above problems, an object of the present invention is to provide a background-sound switching apparatus, a background-sound switching method, a readable recording medium in which a background-sound switching program is recorded, and a video game apparatus that allow background-sound data to be switched suitably.

To achieve the above, according to one aspect of the present invention, there is provided a background-music switching apparatus having display means for displaying variations of events, sound-generating means for generating background sounds, background-sound-data storing means containing background-sound data which is time-series data having been prepared corresponding to the events and including partitioning codes at predetermined partitioning positions, output control means for creating the background-sound data to the sound-generating means to generate background sounds, code-detecting means for detecting the partitioning code in the background-sound data being outputted to the sound-generating means, switching instruction means for outputting an instruction signal for switching from the background-sound data being outputted to the sound-generating means to other background-sound data, and switching control means for switching from the background-sound data to be outputted to the sound-generating means to the other background-sound data in synchronous with timing of detection of the partitioning code to be detected following output of the instruction signal.

According to this configuration, the event variations are displayed on the display means, the background-sound data corresponding to the event variations is outputted to the sound-generating means, and the background sound is generated. In this, when the partitioning code of the background-sound data being outputted to the sound-generating means is detected, and the instruction signal causing switching from the background-sound data being outputted to the sound-generating means is outputted, the background-sound data being outputted to the sound-generating means is switched to other data in synchronization with detection of the partitioning code to be detected following output of the instruction signal. Accordingly, the background-sound data is switched at the predetermined positions, by which the background sound is not suddenly switched, but is naturally switched. This prevents unnatural changes which may be felt when the switching boundary in the background-sound data is clearly identified by the ear.

In the background-sound switching apparatus as described above, the background-sound data may include music data, and the partitioning code may be provided at the end position of a phrase of the music data.

According to this arrangement, since the partitioning code is provided at the end position of the phrase of the background-sound data, the background sound is not suddenly switched, but is naturally switched, thereby preventing unnatural changes, which may be felt when the switching boundary in the background-sound data, is clearly identified by the ear.

Also, in the background-sound switching apparatus as described above, the switching instruction means may output the instruction signal according to the event variation.

According to this arrangement, in which the instruction signal is outputted according to the event variation, and switching can be performed at the predetermined positions of the background-sound data according to the event variation. Therefore, the background-sound data can be suitably switched.

Also, the background-sound switching apparatus as described above may further have standby-data storing means containing identification data for defining the other background-sound data, and data-number control means for storing the identification data in the standby-data storing means upon output of the instruction signal; in which switching control means determines whether or not the identification data is stored in the standby-data storing means when the partitioning code is detected, and if the identification data is stored, the background-sound data being outputted to the sound-generating means is switched to the other data to be defined by the identification data.

According to this configuration, determination is performed as to whether or not the identification data is stored in the standby-data storing means when the partitioning code is detected, and if the identification data is stored, the background-sound data being outputted to the sound-generating means is switched to the other data to be defined by the identification data, by which switching can be performed to the defined other background-sound data without fail in synchronous with timing of the detection of the partitioning code.

According to another aspect of the present invention, there is provided a background-sound switching method for switching from background-sound data prepared corresponding to variations of events to be displayed in display means that contains partitioning codes provided at predetermined partitioning positions of the background-sound data, detecting the partitioning code of the background-sound data being outputted to sound-generating means, and switching from the background-sound data to be outputted to the sound-generating means to other background-sound data in synchronization with detection of the partitioning code to be outputted following output of an instruction signal which causes switching from the background-sound data to be outputted to the sound-generating means to other data.

According to this configuration, the event variations are displayed on the display means, the background-sound data corresponding to the event variations is outputted to the sound-generating means, and the background sound is generated. In this, when the partitioning code of the background-sound data being outputted to the sound-generating means is detected, and the instruction signal causing switching from the background-sound data being outputted to the sound-generating means is outputted, the background-sound data being outputted to the sound-generating means is switched to the other data in synchronization with detection of the partitioning code to be detected following output of the instruction signal. Accordingly, the background-sound data is switched at the predetermined positions, by which the background sound is not suddenly switched, but is naturally switched. This prevents unnatural changes, which may be felt when the switching boundary in the background-sound data, is clearly identified by the ear.

According to yet another aspect of the present invention, there is provided a readable recording medium that contains a background-sound switching program which switches background sounds generated by outputting background-sound data prepared corresponding to variations of events to be displayed on display means, having partitioning codes provided at predetermined positions of the background-sound data, a signal-outputting step for outputting an instruction signal which causes switching from the background-sound data to be outputted to the sound-generating means to other background-sound data, and a switching step for switching from the background-sound data to be outputted to the sound-generating means to the other background-sound data in synchronization with detection of the partitioning code to be outputted following output of the instruction signal.

When the computer reads the readable recording medium and performs execution, the event variations are displayed on the display means, the background-sound data corresponding to the event variations is outputted to the sound-generating means, and the background sound is generated. In this, when the partitioning code of the background-sound data being outputted to the sound-generating means is detected, and the instruction signal causing switching from the background-sound data being outputted to the sound-generating means is outputted, the background-sound data being outputted to the sound-generating means is switched to the other data in synchronization with detection of the partitioning code to be detected following output of the instruction signal. Accordingly, the background-sound data is switched at the predetermined positions, by which the background sound is not suddenly switched, but is naturally switched. This prevents unnatural changes, which may be felt when the switching boundary in the background-sound data, is clearly identified by the ear.

According to still another aspect of the present invention, there is provided a video game apparatus having the background-sound switching apparatus as described above, program-storing means containing the game program, externally-operable operating means, and display control means for controlling images to be displayed on display means according to the game program.

According to this configuration, images of various types are displayed, and the background-sound data corresponding to the game images is outputted to the sound-generating means, and the background sound is generated according to the game program. In this, when the partitioning code of the background-sound data being outputted to the sound-generating means is detected, and the instruction signal causing switching from the background-sound data being outputted to the sound-generating means is outputted, the background-sound data being outputted to the sound-generating means is switched to the other data in synchronization with detection of the partitioning code to be detected following output of the instruction signal. Accordingly, the background-sound data is switched at the predetermined positions, thereby ensuring prevention of unnatural changes, which may be felt when the switching boundary in the background-sound data, is clearly identified by the ear.

The present invention produces advantages as summarized below.

According to the background-sound switching apparatus, background-music switching method, and readable recording medium, when a partitioning code of background-sound data being outputted to the sound-generating means is detected, and an instruction signal causing switching from the background-sound data being outputted to sound-generating means is outputted, the background-sound data being outputted to the sound-generating means is switched to the other data in synchronization with detection of the partitioning code to be detected following output of the instruction signal. Accordingly, the background-sound data is switched at the predetermined positions, thereby allowing prevention of unnatural changes, which may be felt when the switching boundary in the background-sound data, is clearly identified by the ear, by which the background-sound data can be suitably switched.

Also, the background-sound switching apparatus provides the following advantages:

(1) Since the background-sound data includes music data, and the partitioning code is provided at the end position of a phrase of the music data, the background sound is not suddenly switched, but is naturally switched, therefore ensuring prevention of unnatural changes which may be felt when the switching boundary in the background-sound data is clearly identified by the ear.

(2) Since the instruction signal is outputted according to the event variation, switching can be performed at the predetermined positions of the background-sound data according to the event variation. Accordingly, the background-sound data can be suitably switched.

(3) Determination is performed as to whether or not the identification data is stored in standby-data storing means when the partitioning code is detected. As a result, if the identification data is determined to have been stored, the background-sound data being outputted to the sound-generating means is switched to the other data to be defined by the identification data. According to this arrangement, the background-music data can be switched to the defined other background-sound data without fail in synchronous with timing of the detection of the partitioning code.

Also, the video game apparatus has the background-sound switching apparatus as described above, program-storing means containing the game program, externally-operable operating means, and display control means for controlling images to be displayed on the display means according to the game program. Therefore, switching is performed at the predetermined positions of the background-sound data. Therefore, unnatural changes, which may be felt when the switching boundary in the background-sound data, is clearly identified by the ear can be prevented, and simulation effects of the game images to be improved.

DESCRIPTION OF THE PREFERRED EMBODIMENT

Figure 1:
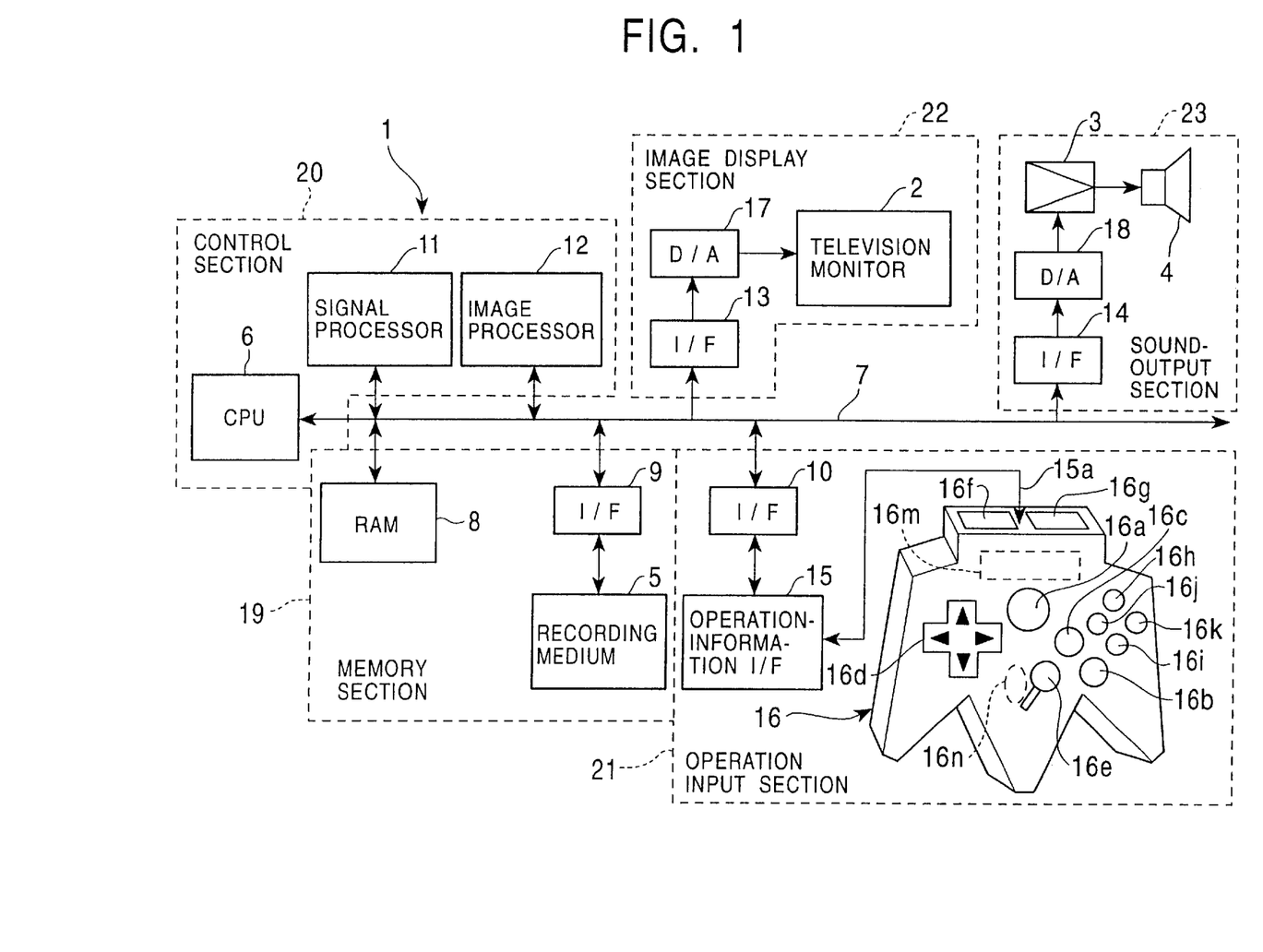
FIG. 1 is a configuration view of an embodiment of a game system according to the present invention.

FIG. 1 is a configuration view showing a game system 1 as an embodiment of the present invention. The game system 1 is constituted of a game-machine main assembly; a television monitor 2 (which is called a "monitor", hereinbelow) as display means for displaying game screens; an amplifier circuit 3 and a speaker 4 (sound-generating means) for outputting game sounds; and a recording medium 5 in which image data, sound data, and a game program composed of program data are recorded. The recording medium 5 is, for example, a so-called cassette ROM, an optical disk, or a flexible disk that is housed in a plastic package, in which program data for, for example, the aforementioned game program and an operating system are stored.

The game-machine main assembly is configured such that a bus 7 composed of an address bus, a data bus, and a control bus are connected to a CPU 6; a RAM 8, an interface circuit 9, an interface circuit 10, a signal processor 11, an image processor 12, an interface circuit 13, and an interface circuit 14 are individually connected to the bus 7; a controller 16 is connected to the interface circuit 10 via an operation-information interface circuit 15; a D/A converter 17 is connected to the interface circuit 13; and a D/A converter 18 is connected to the interface circuit 14.

In this, the RAM 8, the interface circuit 9, and the recording medium 5, as described above, constitute a memory section 19; the aforementioned CPU 6, the signal processor 11, and the image processor 12, as described above, constitute a control section 20 that controls the game progress; the interface circuit 10, the operation-information interface circuit 15, and the controller 16, as described above, constitute an operation-input section 21; the monitor 2, the interface circuit 13, and the D/A converter 17 constitute an image display section 22; and the amplifier circuit 3, the speaker 4, the interface circuit 14, and the D/A converter 18 constitute a sound-output section 23.

The signal processor 11 mainly performs computations in a three-dimensional space, computation for positional transformation from a three-dimensional space to a pseudo-three-dimensional space, computation of light sources, and generation and processing of sound data.

The image processor 12 performs writing of image data, that is, writing of texture data, which is to be written in a display area of the RAM 8.

The controller 16 has externally-operable operating means including a start button 16a, an A-button 16b, a B-button 16c, a cross key 16d, a stick-type controller 16e, a left trigger button 16f, a right trigger button 16g, a C1 button 16h, a C2 button 16i, a C3 button 16j, a C4 button 16k, and a depth trigger button 16n, and sends signals corresponding to operations effected on the individual buttons to the CPU 6.

The stick-type controller 16e has substantially the same arrangement as a joystick. That is, it has a stick installed upright therein, which is bendable in a direction of 360° around a predetermined support point, including the left-right and back and forth directions. Conforming to the bend direction and bend angle of the stick, an x-coordinate value in the left-right direction and a y-coordinate value in the back and forth direction, both coordinates being based on the original upright position, are arranged to be sent to the CPU 6 via the interface circuits 15 and 10.

The controller 16 also has a connector 16m from which, for example, a card-type memory for temporarily memorizing, for example, the game progress status, is detachable.

The game system 1, as described above, varies in configuration according to its use. For home-use configuration of the game system 1, the television monitor 2, the amplifier circuit 3, and the speaker 4 are spaced from the game-machine main assembly. For commercial-use configuration of the game system 1, however, all the components shown in FIG. 1 are integrally stored in a single housing.

Also, when the game system 1 is configured on the basis of a personal computer or a workstation as a nucleus, the television monitor 2 corresponds to a display unit of the computer; the image processor 12 corresponds to part of the game program data recorded in the recording medium 5 or hardware on an expansion board mounted on an expansion slot of the computer; and interface circuits 9, 10, 13, and 14, D/A converters 17 and 18, and the operation-information interface circuit 15 correspond to the hardware on the expansion board mounted on the expansion slot of the computer. Also, the RAM 8 corresponds to a main memory or individual areas of an expansion memory of the computer.

In this embodiment, a description will be given taking an example case where the game system 1 is configured for home use.

Hereinbelow, an overall operation of the game system 1 is described below.

When a power switch (not shown) is turned on, and the game system 1 is powered on, the CPU 6 performs reading of image data and sound data, and the game program from the recording medium 5 in accordance with an operating system stored in the recording medium 5. All or some of the data read out are transferred to the RAM 8 to be stored therein. Subsequently, the CPU 6 commands the game to proceed on the basis of the game program data contained in the RAM 8 and the type of instructions a game player issues using the controller 16. In particular, the CPU 6 generates commands as tasks for, for example, creating images and outputting sounds, according to operation signals sent from the controller 16 as and when required by instructions the game player issues using the controller 16.

In response to the above-described commands, the signal processor 11 performs computations such as character-position computation and light-source computation in a three-dimensional space (the same as in a two-dimensional space, as a matter of course), and in addition, functions as output control means for performing generation of sound data. On the basis of results of the aforementioned computations, the image processor 12 performs writing of image data that must be drawn in a display area of the RAM 8, and the like. The D/A converter 17 converts the image data written in the RAM 8 to an analog signal in every predetermined cycle via the interface circuit 13 and then displays the signal as an image on a tube face of the monitor 2. On the other hand, the data which has been outputted from the signal processor 11 is fed, via the interface circuit 14, to the D/A converter 18 in which the data is converted to an analog signal, and the signal is then outputted from the speaker 4 via the amplifier circuit 3 as sounds.

Figure 2:
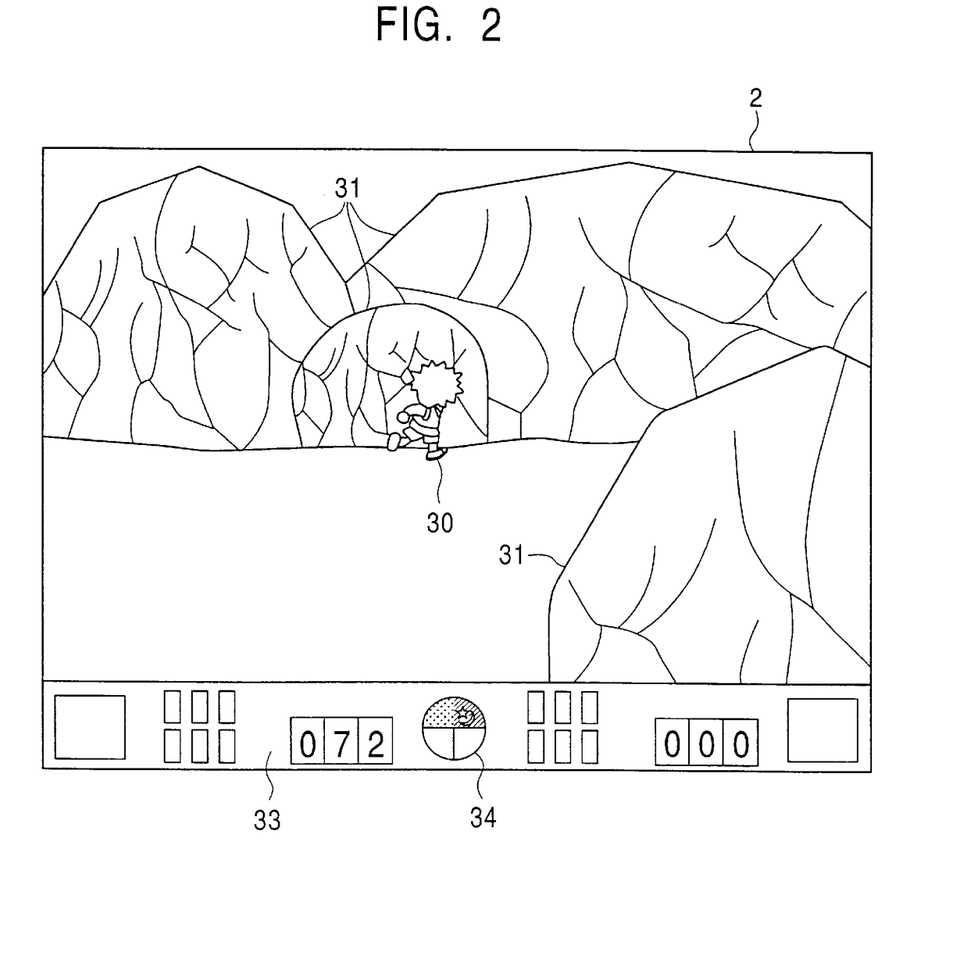
FIG. 2 is a view of a screen of a video game.
Figure 3:
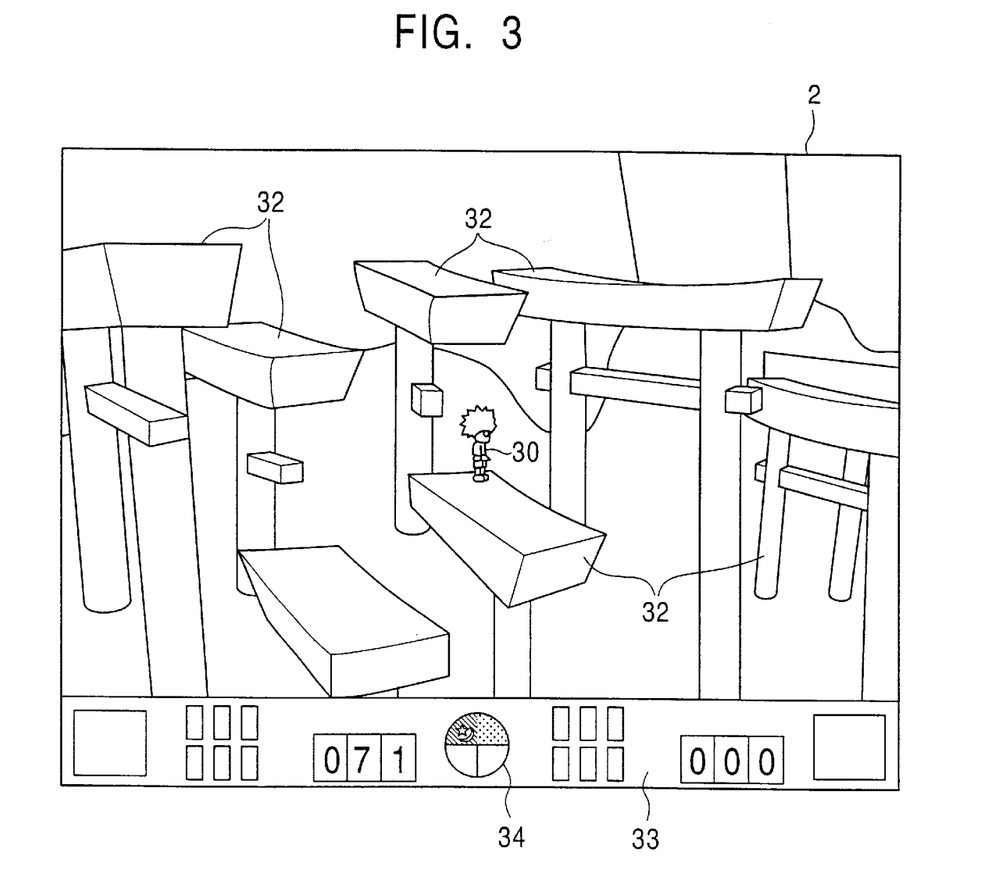
FIG. 3 is a view of another screen of the video game.

Hereinbelow, referring to FIGS. 2 and 3, a description will be given of an outline of a video game to be executed by the game program recorded in the recording medium 5. FIGS. 2 and 3 each show a screen of the game.

This video game is such that, according to the operations performed by a game player on the controller 16 by a game player, a leading character performs actions such as battles with an opponent character, and obtains items so as to satisfy predetermined conditions to be cleared in a game stage, whereby the game proceeds to the next stage.

As shown in FIGS. 2 and 3, a leading character 30 is displayed substantially in the center of the screen of the monitor 2, and around the leading character 30, as models representing geometrical shapes and structural elements. FIG. 2 shows a display of rock models 31, and FIG. 3 shows a display of a shrine-gateway models 32. Also, the lower portion of the monitor 2 displays weapon items the leading character 30 is to carry and a game-status display section 33 for displaying a life gage.

Also, in this video game, game time that runs at a predetermined rate according to the passing game time is set, and a daytime/nighttime status display section 34 is provided in the game-status display section 33. In the daytime/nighttime status display section 34, display contents of the upper semicircular section are rotated clockwise around the center of a circular display section, and colors ranging from light blue to white (which are displayed by reticulate dots in FIGS. 2 and 3) indicate daytime, and a star and crescent marks indicate nighttime. In this way, according to the display status in the upper semicircular section, the daytime/nighttime status of the game time is identifiably displayed. For example, the daytime/nighttime status display section 34 in FIG. 2 indicates early morning time, and the daytime/nighttime status display section 34 in FIG. 3 indicates evening time.

The running rate of the game time is set independently of the game stage that proceeds according to the type of operation effected on the controller 16. Therefore, even in the same game screen, the daytime/nighttime status differs depending on the rate of operation effected on the controller 16.

Figure 4:
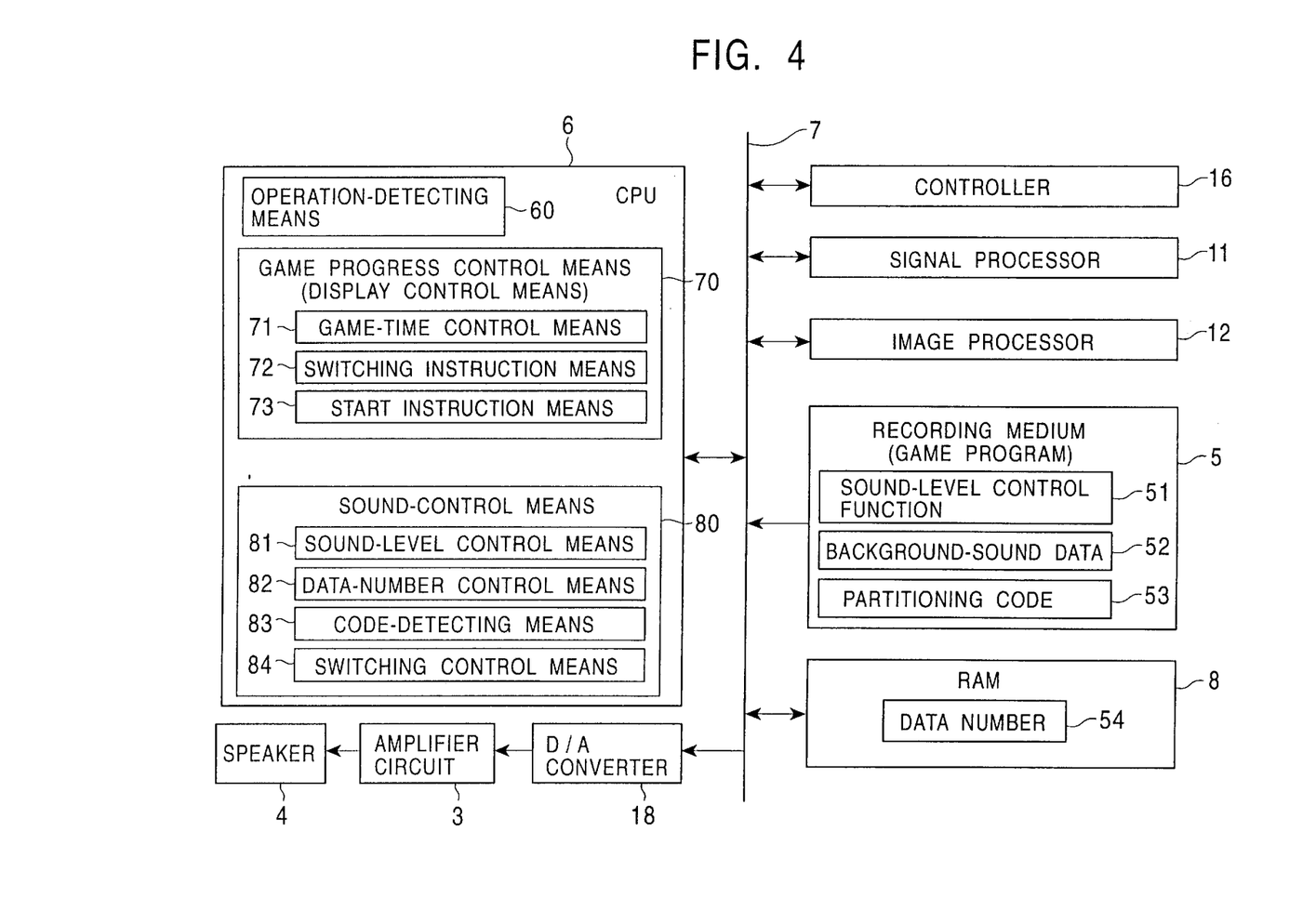
FIG. 4 is a schematic view of major portions in FIG. 1 and of functional blocks.
Figure 5:
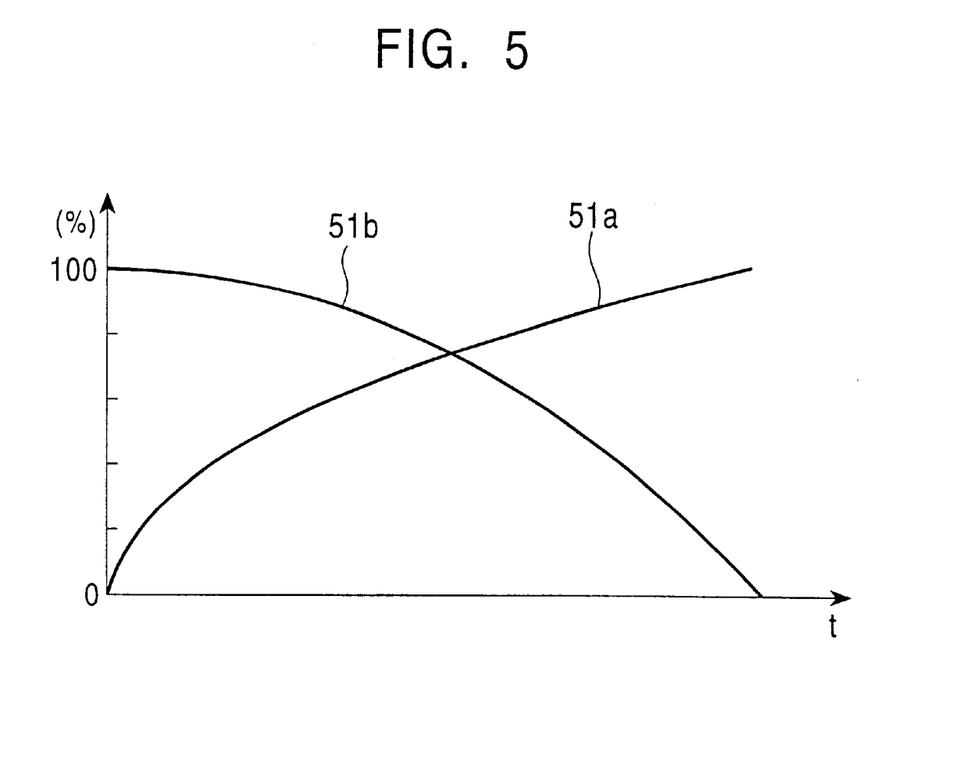
FIG. 5 is an illustration of sound-level control functions.
Figure 6:
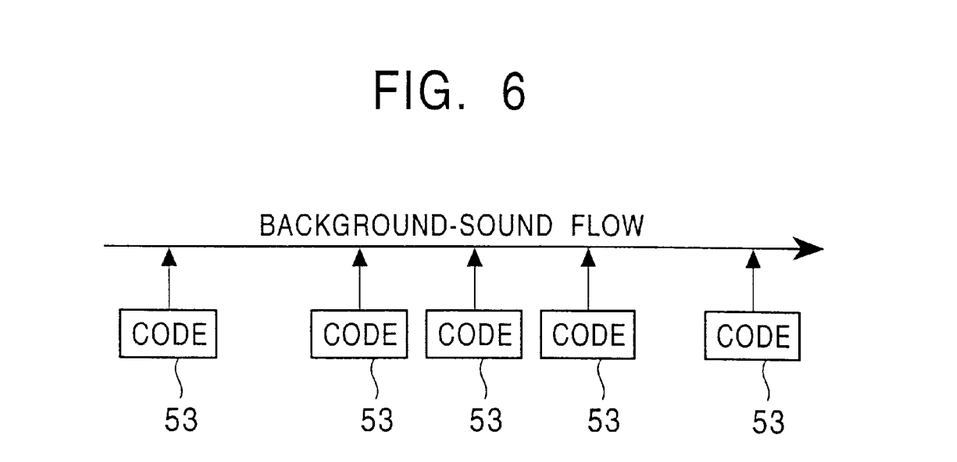
FIG. 6 is a drawing to be used for explaining partitioning codes.

FIG. 4 is a schematic view showing function blocks of the CPU 6 and main portions in FIG. 1. FIG. 5 is a drawing showing sound-level control functions. FIG. 6 is a drawing illustrative of partitioning codes.

As described above, the recording medium 5 contains the game program. It also contains data such as a sound-level control function 51, multiple pieces of background-sound data 52, and partitioning codes 53 as part of the game program. In this invention, the recording medium 5 is also referred to as function-storing means or background-sound-data storing means.

As described below, the sound-level control function 51 is used in computation of data to produce output ratios of sound levels predetermined with the background-sound data 52 when the background-sound data 52 is outputted to the D/A converter 18, and a first function 51a and a second function 51b as shown in FIG. 5 are stored in the recording medium 5.

The first function 51a is predefined so that the output ratio increases sharply from 0%, and thereafter, increases gradually up to 100%. The second function 51b is predefined so that the output ratio decreases gradually from the output ratio of 100%, and thereafter sharply decreases from 100%. In this embodiment, quadratic functions are used as the first and second functions 51a and 51b.

For the multiple pieces of background-sound data 52, for example, the background-sound data for the nighttime and the background-sound data of daytime are prepared individually according to game stages and game times. The background-sound data 52 is composed of a plurality of channels, and quasisounds, such as a "Japanese drum", a "base", and a "synthesizer sound", are composed in the individual channels.

The partitioning code 53 represents the end position of a phrase of the background sound (the natural division of a melody flow) outputted from the speaker 4, as shown in FIG. 6. A data number 54 of the other background-sound data is temporarily stored in the RAM 8 when background-sound data being outputted to the D/A converter 18 is switched to other background-sound data. The RAM 8 is also referred to as standby-data storing means.

The CPU 6 controls operations of individual system-configuration elements according to the game program. It has operation-detecting means 60, game-progress control means 70, and sound control means 80. The operation-detecting means 60 detects the type of game-player operation of the controller 16 according to an operation signal sent from the controller 16. The game-progress control means 70 controls the game progress according to the type of operation of the controller 16 and the game program, and concurrently, has a function for controlling images displayed on the monitor 2. In addition, as functional blocks, the game-progress control means 70 includes game-time control means 71, switching instruction means 72, and start instruction means 73. The sound control means 80 generates a sound-outputting command for the background sound and effect sounds; and as functional blocks, it has sound-level control means 81, data-number control means 82, code-detecting means 83, and switching control means 84.

The game-time control means 71 in the game-progress control means 70 runs the game time at a predetermined rate according to the elapsed game time, and also controls the display contents of the daytime/nighttime status display section 34.

The switching instruction means 72 outputs a switching instruction signal which causes switching from the background-sound data being output to the D/A converter 18 at such a moment when the game stage is switched or the daytime/nighttime status is changed either from daytime to nighttime or from nighttime to daytime. The start instruction means 73 outputs a start signal that instructs start of crossfading sound-level control, which is described below, when the game time passes to a predetermined point. The sound-level control means 81 in the sound control means 80 controls the output ratio on the basis of the channels when background-sound data is outputted through the speaker 4 according to the sound level set in the background-sound data 52.

Upon the output of the switching instruction signal, the data-number control means 82 stores the data number 54 defining the background-sound data 52 in a predetermined area of the RAM 8. The code-detecting means 83 detects the partitioning code 53 appended to the background-sound data 52 being outputted to the D/A converter 18.

The switching control means 84 has the following functions:

(1) A function as data-number determining means that determines whether or not the data number 54 defining the background-sound data 52 is stored in the predetermined area of the RAM 8 after each detection of the partitioning code 53.

(2) A function as data switching means that switches from the background-sound data 52 being outputted to the D/A converter 18 to other background-sound data 52 to be defined by the data number 54 when the data number 54 defining the background-sound data 52 is stored in the predetermined area of the RAM 8.

Figure 7:
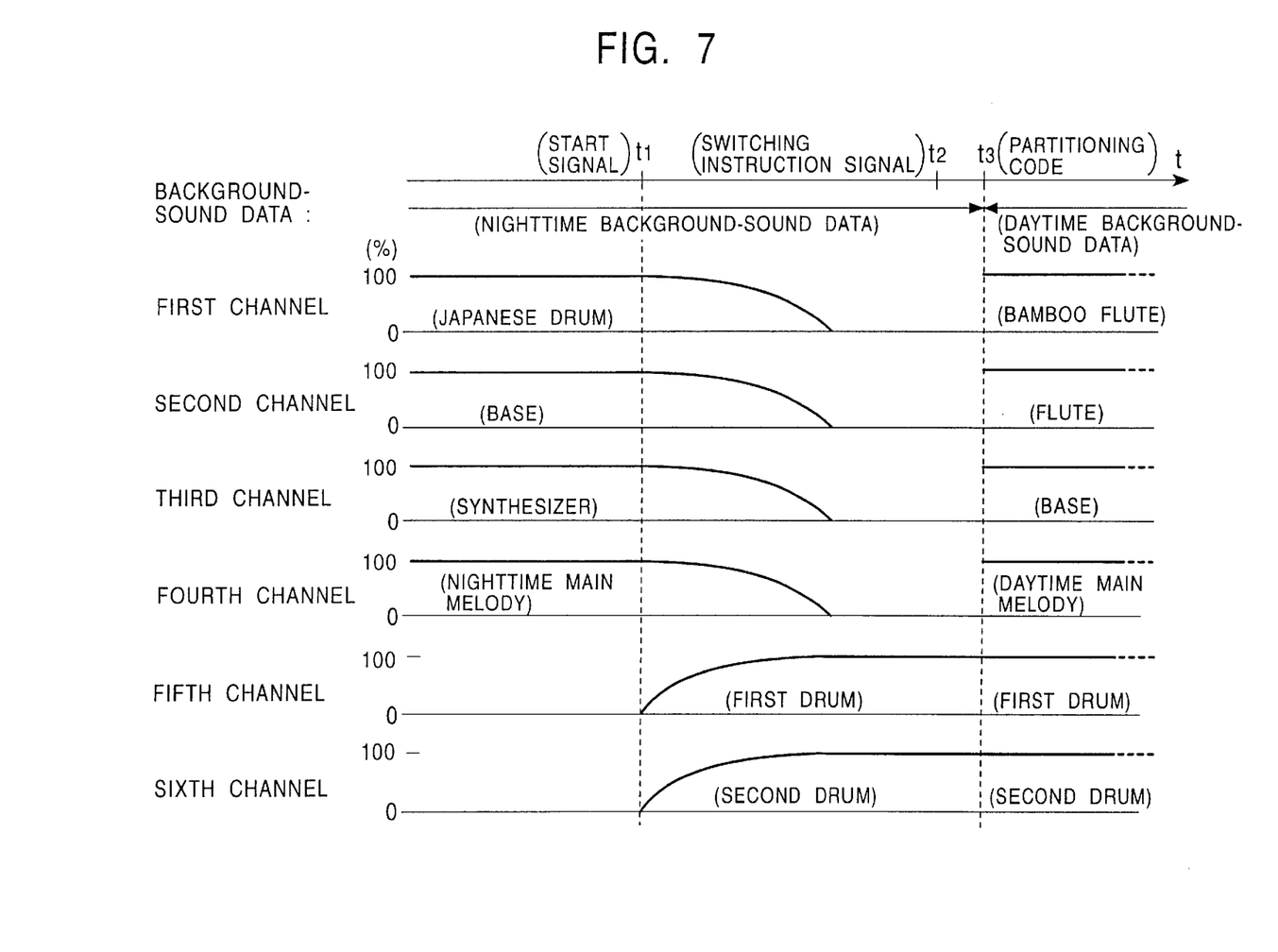
FIG. 7 shows timing-charts indicating output ratios for individual channels for sound levels defined in background-sound data.

Hereinbelow, referring to FIGS. 5 and 7, a description will be given of crossfading sound-level control to be performed by the sound-level control means 81. FIG. 7 shows timing charts indicating output ratios of individual channels for sound levels defined in the background-sound data. FIG. 7 shows a case where the daytime/nighttime status of the game proceeds from nighttime to daytime, and the outputted background-sound data is switched from nighttime background-sound data to daytime background-sound data.

In this embodiment, the individual background-sound data is composed of six channels, which are a first channel to a sixth channel. The individual pieces of nighttime background-sound data are composed of quasisounds of, for example, a "Japanese drum", a "base", a "synthesizer", a "nighttime main melody", a "first drum", and a "second drum". The individual pieces of daytime background-sound data are composed of quasisounds of, for example, a "bamboo flute", a "flute", a "base", a "daytime main melody", a "first drum", and a "second drum".

As FIG. 7 shows, as output ratios of the individual channels of the nighttime background-sound data for the defined sound level, those for the first channel to the fourth channel are maintained at 100% from the beginning, and those for the fifth channel and the sixth channel are maintained at 0% from the beginning. When a start signal is outputted at a time $t_1$, crossfading sound-level control is performed according to the sound-level control function 51. That is, output ratios of the first channel to the fourth channel are reduced from 100% according to the second function 51b; and output ratios of the fifth channel and the sixth channel are increased from 0% according to the first function 51a. When the game time proceeds, a switching instruction signal is outputted at a predetermined time $t_2$, and thereafter, a partitioning code is detected at a time $t_3$, the nighttime background-sound data is switched synchronously to the daytime background-sound data, and the output ratios of the individual channels in the daytime background-sound data are maintained at 100%.

In the above case, the "first drum" of the fifth channel and the "second drum" of the sixth channel are continuously used in the fifth channel and the sixth channel of the daytime background-sound data. Therefore, the background sound to be outputted through the speaker 4 changes gradually from the time $t_1$. This allows the background sound to be suitably switched.

Also, the background sound is switched in synchronous with detection of the partitioning code appended to each phrase. In this case, since the background sound does not suddenly switch but switches naturally, even when the background-sound data is switched, the boundary cannot be perceived by the ear. Thus, switching of the background-sound data can be smoothly performed, thereby allowing switching of the background-sound data to be performed even more suitably.

In this embodiment, from the time when the start signal is outputted, output ratios of the first channel to the fourth channel are gradually reduced from 100%, and output ratios of the fifth channel and the sixth channel are increased sharply from 0%. According to experiments by the inventor and others, compared to the case where the individual channels are linearly increased or reduced, switching of the background sound to be outputted through the speaker 4 can be determined even more clearly.

Figure 8:
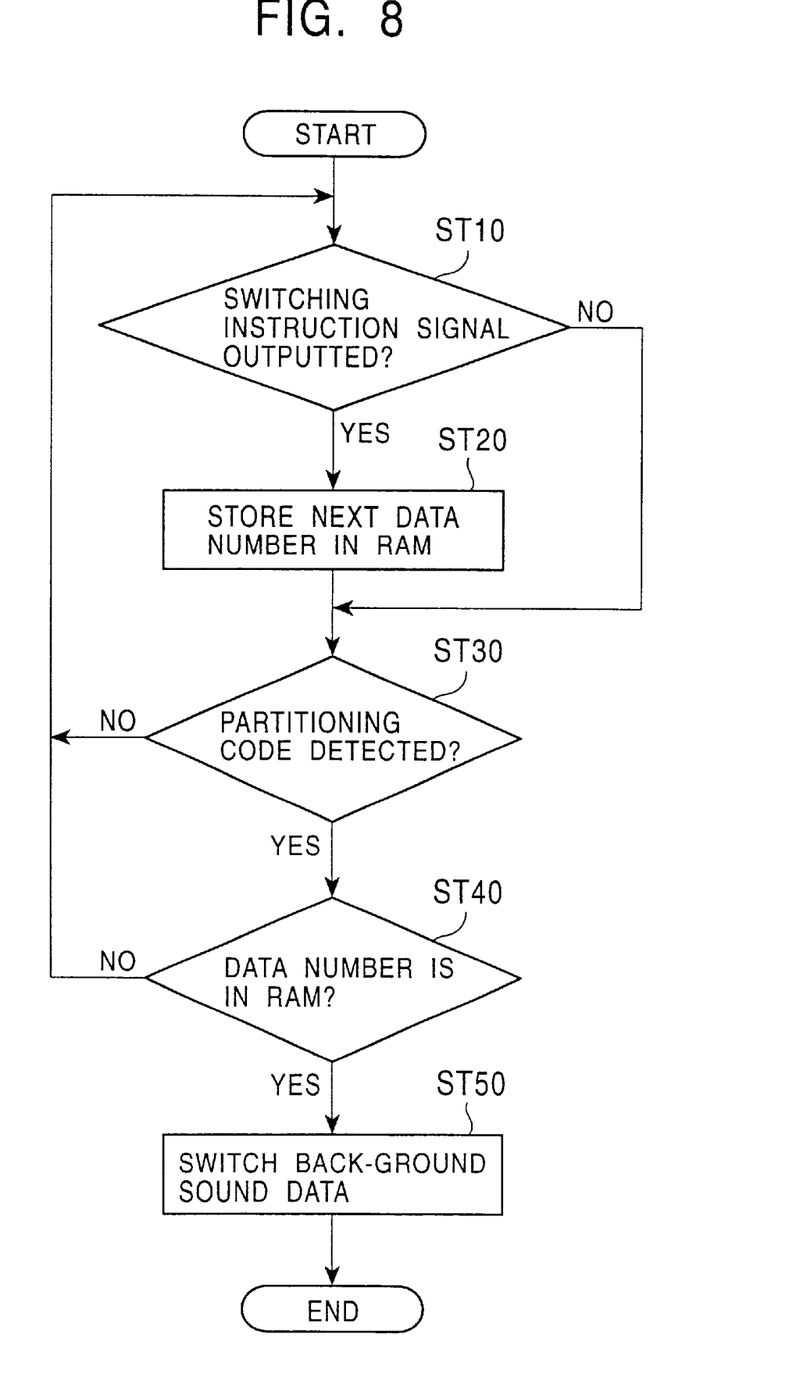
FIG. 8 is a flowchart of operation steps of a background-sound switching program.

Hereinbelow, referring to the flowchart in FIG. 8, a description will be given of operation steps of a background-sound switching program, which switches the background-sound data.

The program determines whether or not a switching instruction signal has been outputted according to progress in the game time, the game, and the like (step ST10). If the switching instruction signal is outputted (YES in step ST10), a data number defining the next background-sound data is stored in the RAM 8 (step ST20). If the switching instruction signal is not outputted (NO in step ST10), control proceeds to step ST30.

Subsequently, the program determines whether or not a partitioning code is detected in the background-sound data currently being outputted (step ST30). If a partitioning code is detected (YES in step ST30), the program determines whether or not a data number is stored in the RAM 8 (step ST40). If a data number is stored (YES in step ST40), the background-sound data is switched (step ST50). If a partitioning code is not detected (NO in step ST30), or if a data number is not stored in the RAM 8 (NO in step ST40), control returns to step ST10.

Figure 9:
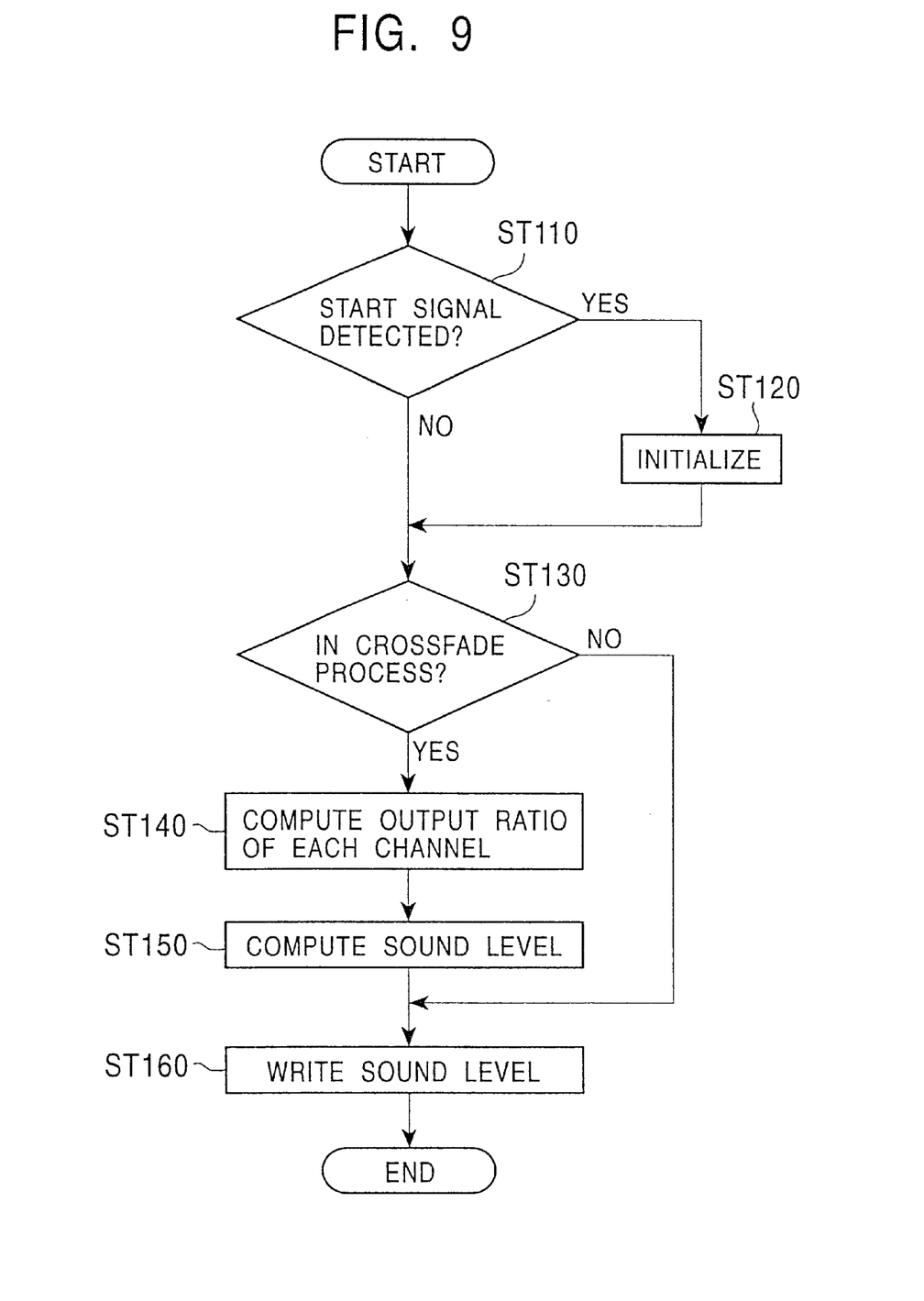
FIG. 9 is a flowchart of operation steps of a background-sound control program for crossfading sound-level control.

Hereinbelow, referring to the flowchart in FIG. 9, a description will be given of operation steps of a background-sound control program for the crossfading sound-level control by the sound control means 80. This routine is executed as a process-interrupting routine in each predetermined cycle.

First, the program determines whether or not a start signal for the crossfading sound-level control is outputted (step ST110). If the start signal is outputted (YES in step ST110), initialization is performed for the crossfading sound-level control, a flag representing that the crossfading sound-level control is in progress is set (step ST120), and control proceeds to step ST130.

If the start signal is not outputted (NO in step ST110), the program determines whether or not the crossfading sound-level control is already being processed (step ST130). If the crossfading sound-level control is in process (YES in step ST130), output ratios of the individual channels are computed by using the sound-level control function 51 from a passing time from the time when the start signal is outputted (step ST140). That is, in the example in FIG. 7, output ratios of the first channel to the fourth channel are computed according to the second function 51b, and output ratios of the fifth channel and the sixth channel are computed according to the second function 51b.

Subsequently, sound levels for the individual channels are computed using the computed output ratios. In specific, absolute values representing sound levels that must be outputted through the speaker 4 are computed (step ST150), the computed sound levels for the individual channels are written into predetermined areas of the RAM 8, and then this routine ends.

If the crossfading process is not in progress in step ST130 (NO in step ST130), default sound levels set in the background-sound data are written for individual channels (step ST160). Then, this routine ends.

In this way, according to this embodiment, output ratios of sound levels of the first to fourth channels are maintained at 100%, and output ratios of sound levels of the fifth and sixth channels are maintained at 0%. In this, when the start signal is outputted, the output ratios of the first to fourth channels are reduced, and concurrently, the crossfading sound-level control is performed to increase the output ratios of the fifth and sixth channels. This allows smooth switching background-sound data to be outputted through the speaker 4 from nighttime background-sound data to daytime background-sound data. In this way, switching of the background-sound data can be performed suitably.

Also, switching of the background-sound data can be performed so as to be heard even more easily. This can be achieved when the daytime background-sound data after switching is arranged to include quasisound data which has been set in the firth and sixth channels increased by the crossfading process from the pre-switching state to 100% set.

Also, the partitioning code 53 representing the end position of the phrase of the background-sound data is provided, and the background-sound data is switched synchronously at the time when the partitioning code 53 is detected. This prevents unnatural changes which may be felt when the background sound is switched during processing of a phrase, and the boundary of switching is perceived by the ear. In this way, background-sound data can be suitably switched.

Also, since a prefixed sound source such as that implemented for recording media, for example, CD-ROMs, is not used, the background sound can be generated in the real time depending on the game status.

The present invention is not restricted to the above embodiment and may employ modifications described below.

(1) In the above embodiment, as the first and second functions 51a and 51c, quadratic functions are used. However, there is no such restriction. As long as the first function 51a allows the output ratio to increase sharply from 0% and allows the second function 51b to decrease gradually from 100%, the functions may be trigonometric functions, exponential functions, logarithmic functions, or other functions.

(2) In the above embodiment, the background-sound data is switched according to the game time. However, there is no such restriction. The background-sound data may be switched, for example, in each change of the game stage, such as places where the main character battles the opponent character, and stairs in a castle and a building.

(3) In the above embodiment, the output ratio of each channel is either increased or reduced. However, there is no such restriction. The output ratio of the sound level of a predetermined channel may be increased or reduced according to the game status relevant to, for example, the number of opponent characters.

Figure 10:
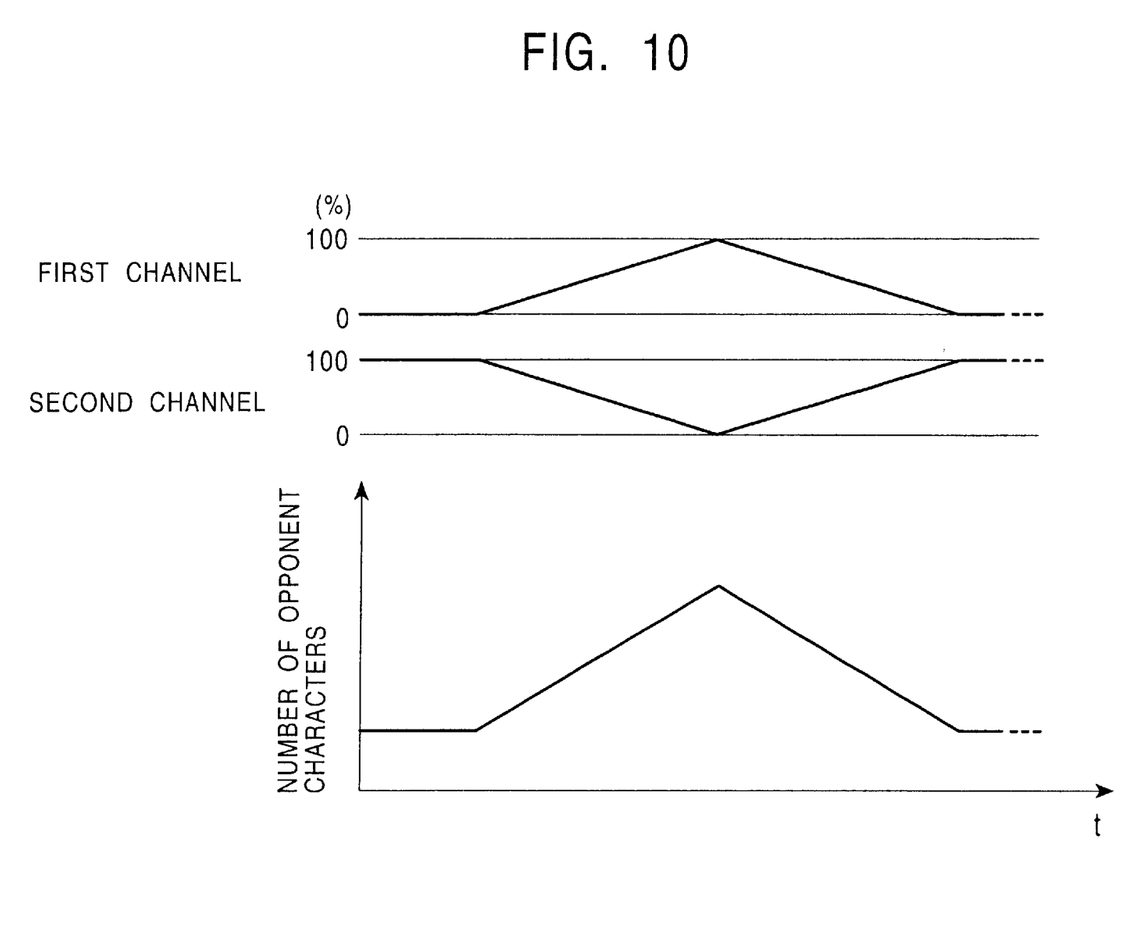
FIG. 10 shows timing-charts of another example of the sound-level control.

For example, in FIG. 10, when the number of opponent characters increases, the output ratio of the first channel increases, and concurrently, the output ratio of the second channel decreases. Also, when the number of opponent characters decreases, the output ratio of the first channel decreases, and concurrently, the output ratio of the second channel increases. In the case of FIG. 10, for the sound-level control function 51, a function allowing the output ratio to increase and decrease in the range of 0% to 100% is preferably set. In this case, the number of channels of background-sound data is not restricted to the number shown in FIGS. 7 and 10, and the number may be at least one. According to this mode of the invention, even when the number of CPU-usable output ports is restricted, whereby the number of channels of the background-sound data is restricted, variation can be provided in the background sound. This allows effectiveness of the background sound to be improved.

(4) The above embodiment is a video game apparatus which the game player operates. However, there is no such restriction. The apparatus may be an image-creating apparatus that outputs background sounds corresponding to images displayed on the monitor 2. Also, the display means is not restricted to the image display apparatuses, such as a monitor, and other display means of various types, such as mechanical, optical, and acoustic types may be considered to be used. The display means includes, for example, the type for a so-called "mole-whacking game". In this case, variation in popping-up of moles, the popping-up rate, the popping-up count, and the like, is displayed as the event variation.

(5) In the described embodiment, the first channel to the fourth channel are faded out to be silent and are then switched. However, there is no such restriction. The channels may be switched before they are faded out to be silent. In this case, the background-sound data before or after switching is set so that the background sound can be heard naturally.

(6) In the described embodiment, the output ratio of the background-sound data is varied according to the variation in the game time. However, there is no such restriction. The output ratio may be varied according to variation of the image displayed on the monitor 2, and variation of the operations performed on the controller 16. Also, the output ratio may be varied according to variation of an event such as moles that pop up in the case of the so-called mole-whacking game.

(7) Switching of the background-sound data may be varied according to variation of the operation effected on the controller 16. Also, the switching may be varied according to the variation of an event such as moles popping up as in the mole-whacking game.

What is claimed is:

1. A background-sound switching apparatus comprising:
display means for displaying variations of events;
sound-generating means for generating background sounds;
background-sound-data storing means containing a plurality of background-sound data each of which is time-series data of an audio composition prepared to correspond to the events and includes partitioning codes at predetermined partitioning positions within the audio composition for transitioning to another one of the plurality of background-sound data;

output control means for sending the background-sound data to the sound-generating means from the background-sound-data storing means to generate background sounds;

code-detecting means for detecting the partitioning code in the background-sound data being outputted to the sound-generating means;

switching instruction means for outputting an instruction signal for switching from the background-sound data being outputted to the sound-generating means to another one of the background-sound data; and switching control means for switching from the background-sound data being outputted to the sound-generating means to the another one of the background-sound data in synchronous with detection of the partitioning code detected following output of the instruction signal.

2. A background-sound switching apparatus as claimed in claim 1, wherein the background-sound data includes music data, and the partitioning code is provided at the end position of a phrase of the music data.

3. A background-sound switching apparatus as claimed in claims 1, wherein the switching instruction means outputs the instruction signal according to the variation of the events.

4. A background-sound switching apparatus as claimed in claim 2, wherein the switching instruction means outputs the instruction signal according to the variation of the events.

5. A background-sound switching apparatus as claimed in claim 1, further comprising:

stand-by-data storing means containing identification data for defining the another one of the background-sound data, and data-number control means for storing the identification data in the standby-data storing means upon output of the instruction signal;

wherein the switching control means determines whether or not the identification data is stored in the standby-data storing means when the partitioning code is detected, and if the identification data is stored, the background-sound data being outputted to the sound-generating means is switched to other data defined by the identification data.

6. A background-sound switching apparatus as claimed in claim 2, further comprising:

standby-data storing means containing identification data for defining the another one of the background-sound data, and data-number control means for storing the identification data in the standby-data storing means upon output of the instruction signal;

wherein the switching control means determines whether or not the identification data is stored in the standby-data storing means when the partitioning code is detected, and if the identification data is stored, the background-sound data being outputted to the sound-generating means is switched to the another one of the data defined by the identification data.

7. A background-sound switching apparatus as claimed in claim 3, further comprising:

standby-data storing means containing identification data for defining the another one of the background-sound data, and data-number control means for storing the identification data in the standby-data storing means upon output of the instruction signal;

wherein the switching control means determines whether or not the identification data is stored in the standby-data storing means when the partitioning code is detected, and if the identification data is stored, the background-sound data being outputted to the sound-generating means is switched to the another one of the data defined by the identification data.

8. A background-sound switching method for switching from a plurality of background-sound data prepared corresponding to variations of events to be displayed in display means, said plurality of background-sound data being audio compositions containing partitioning codes provided at predetermined partitioning positions within the audio compositions of the plurality of background-sound data for transitioning to another one of the plurality of background-sound data, detecting the partitioning code of the background-sound data being outputted to sound-generating means, and switching from the background-sound data outputted to the sound-generating means to other background-sound data in synchronization with detection of the partitioning code outputted following output of an instruction signal which causes switching from the background-sound data to be outputted to the sound-generating means to the another one of the background-sound data.

9. A readable recording medium containing a plurality of background-sound switching program which switches background sounds generated by outputting the plurality of background-sound data prepared corresponding to variations of events displayed on display means, said plurality of background-sound data being audio compositions, comprising:

partitioning codes provided at predetermined positions of the background-sound data within said audio compositions of the plurality of background-sound data for transitioning to another one of the plurality of background-sound data;

a signal-outputting step for outputting an instruction signal which causes switching from one of the plurality of background-sound data outputted to the sound-generating means to another one of the plurality of background-sound data; and a switching step for switching from the one of the plurality of background-sound data outputted to the sound-generating means to the another one of the plurality of background-sound data in synchronization with detection of the partitioning code outputted following output of the instruction signal.

10. A video game apparatus comprising:

a background-sound switching apparatus including:

display means for displaying variations of events;

sound-generating means for generating background sounds;

background-sound-data storing means containing a plurality of background-sound data which is time-series data of an audio composition prepared to correspond to the events and including partitioning codes at predetermined partitioning positions within said audio compositions of the plurality of background-sound data for transitioning to another one of the plurality of background-sound data;

output control means for sending the plurality of background-sound data to the sound-generating means from the background-sound-data storing means to generate background sounds;

code-detecting means for detecting the partitioning code in the background-sound data being outputted to the sound-generating means;

switching instruction means for outputting an instruction signal for switching from one of the plurality of background-sound data being outputted to the sound-generating means to another one of the plurality of background-sound data; and switching control means for switching from the one of the plurality of background-sound data being outputted to the sound-generating means to the another one of the plurality of background-sound data in synchronous with detection of the partitioning code detected following output of the instruction signal;

program-storing means containing a game program;

externally-operable operating means; and display control means for controlling images displayed on the display means according to the game program.

11. A video game apparatus comprising:

a background-sound switching apparatus including:

display means for displaying variations of events;

sound-generating means for generating background sounds;

background-sound-data storing means containing a plurality of background-sound data each of which is time-series data of an audio composition prepared to correspond to the events and including partitioning codes at predetermined partitioning positions within the audio composition, wherein the background-sound data of the audio compositions include music data, and the partitioning code is provided at the end position of a phrase and before a next phrase of the music data within a respective one of the plurality of background-sound data for transitioning to another one of the plurality of background-sound data;

output control means for sending the background-sound data to the sound-generating means from the background-sound-data storing means to generate background sounds;

code-detecting means for detecting the partitioning code in the background-sound data being outputted to the sound-generating means;

switching instruction means for outputting an instruction signal for switching from the background-sound data being outputted to the sound-generating means to other background-sound data; and switching control means for switching from the background-sound data being outputted to the sound-generating means to the another one of the background-sound data in synchronous with detection of the partitioning code detected following output of the instruction signal;

program-storing means containing a game program;

externally-operable operating means; and display control means for controlling images displayed on the display means according to the game program.

12. A video game apparatus comprising:

a background-sound switching apparatus including:

display means for displaying variations of events;

sound-generating means for generating background sounds;

background-sound-data storing means containing a plurality of background-sound data each of which is time-series data of an audio composition prepared to correspond to the events and including partitioning codes at predetermined partitioning positions within said audio compositions of the plurality of background-sound data for transitioning to another one of the plurality of background-sound data;

output control means for sending the background-sound data to the sound-generating means from the background-sound-data storing means to generate background sounds;

code-detecting means for detecting the partitioning code in the background-sound data being outputted to the sound-generating means;

switching instruction means for outputting an instruction signal for switching from the background-sound data being outputted to the sound-generating means to other background-sound data, wherein the switching instruction means outputs the instruction signal according to the variation of the events; and switching control means for switching from the background-sound data being outputted to the sound-generating means to the another one of the background-sound data in synchronous with detection of the partitioning code detected following output of the instruction signal;

program-storing means containing a game program;

externally-operable operating means; and display control means for controlling images displayed on the display means according to the game program.

13. A video game apparatus comprising:

a background-sound switching apparatus including:

display means for displaying variations of events;

sound-generating means for generating background sounds;

background-sound-data storing means containing a plurality of background-sound data each of which is time-series data of an audio composition prepared to correspond to the events and including partitioning codes at predetermined partitioning positions within audio compositions of the plurality of background-sound data for transitioning to another one of the plurality of background-sound data, wherein the background-sound data includes audio compositions of music data, and the partitioning code is provided at an end position of a phrase of the music data;

output control means for sending the background-sound data to the sound-generating means from the background-sound-data storing means to generate background sounds;

code-detecting means for detecting the partitioning code in the background-sound data being outputted to the sound-generating means;

switching instruction means for outputting an instruction signal for switching from the background-sound data being outputted to the sound-generating means to other background-sound data, wherein the switching instruction means outputs the instruction signal according to the variation of the events; and switching control means for switching from the background-sound data being outputted to the sound-generating means to the another one of the background-sound data in synchronous with detection of the partitioning code detected following output of the instruction signal;

program-storing means containing a game program;

externally-operable operating means; and display control means for controlling images displayed on the display means according to the game program.

14. A background-sound switching apparatus comprising:

display means for displaying variations of events;

sound-generating means for generating background sounds;

background-sound-data storing means containing a plurality of background-sound data each of which is time-series data prepared to correspond to the events and includes partitioning codes at predetermined partitioning positions at an end of at least one phrase, and before a next phrase, within a respective one of the plurality of background-sound data for transitioning to another one of the plurality of background-sound data;

output control means for sending the background-sound data to the sound-generating means from the background-sound-data storing means to generate background sounds;

code-detecting means for detecting the partitioning code in the background-sound data being outputted to the sound-generating means;

switching instruction means for outputting an instruction signal for switching from the background-sound data being outputted to the sound-generating means to another one of the background-sound data; and switching control means for switching from the background-sound data being outputted to the sound-generating means to the another one of the background-sound data in synchronous with detection of the partitioning code detected following output of the instruction signal.

15. The background-sound switching apparatus as claimed in claim 14, further comprising:

standby-data storing means containing identification data for defining the another one of the background-sound data, and data-number control means for storing the identification data in the standby-data storing means upon output of the instruction signal;

wherein the switching control means determines whether or not the identification data is stored in the standby-data storing means when the partitioning code is detected, and if the identification data is stored, the background-sound data being outputted to the sound-generating means is switched to other data defined by the identification data.

16. A background-sound switching method comprising the steps of:

providing a plurality of background-sound data each of which is time-series data prepared and includes partitioning codes at predetermined partitioning positions at an end of at least one phrase, and before a next phrase, within a respective one of the plurality of background-sound data for transitioning to another one of the plurality of background-sound data;

sending the background-sound data to a sound-generating means from the background-sound-data storing means to generate background sounds;

detecting the partitioning codes in the background-sound data being outputted to the sound-generating means; and switching from the background-sound data outputted to the sound-generating means to other background-sound data in synchronization with detection of the partitioning code outputted following output of an instruction signal for switching from the background-sound data outputted to the sound-generating means to the another one of the background-sound data.

17. The background-sound switching method as claimed in claim 16, further comprising:

storing identification data for defining the another one of the background-sound data, and reading and storing the identification data in a standby-data storing means upon output of the instruction signal; and determining whether the identification data is stored in the standby-data storing means when the partitioning code is detected, and if the identification data is stored, switching the background-sound data output by the sound-generating means to the another one of the data defined by the identification data.

18. A readable recording medium containing a background-sound switching program which switches background sounds which executes the following steps:

providing a plurality of background-sound data each of which is time-series data prepared and includes partitioning codes at predetermined partitioning positions at an end of at least one phrase, and before a next phrase, within a respective one of the plurality of background-sound data for transitioning to another one of the plurality of background-sound data;

sending the background-sound data to a sound-generating means from the background-sound-data storing means to generate background sounds;

detecting the partitioning codes in the background-sound data being outputted to the sound-generating means; and switching from the background-sound data outputted to the sound-generating means to other background-sound data in synchronization with detection of the partitioning code outputted following output of an instruction signal for switching from the background-sound data outputted to the sound-generating means to the another one of the background-sound data.

19. The readable recording medium of claim 18 wherein the program further executes the following steps:

providing identification data for defining the another one of the background-sound data, and reading and storing the identification data in a standby-data storing means upon output of the instruction signal; and determining whether the identification data is stored in the standby-data storing means when the partitioning code is detected, and if the identification data is stored, switching the background-sound data output by the sound-generating means to the another one of the data defined by the identification data.

* * * * *